(12) United States Patent
Riedel et al.

(10) Patent No.: US 8,212,381 B2
(45) Date of Patent: Jul. 3, 2012

(54) METHOD AND SYSTEM FOR THE VOLTAGE SUPPLY OF AIRCRAFT CABIN MODULES

(75) Inventors: Christian Riedel, Bliedersdorf (DE); Sven-Olaf Berkhahn, Ohlendorf (DE); Hans-Achim Bauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/759,796

(22) Filed: Apr. 14, 2010

(65) Prior Publication Data

US 2010/0264727 A1 Oct. 21, 2010

Related U.S. Application Data

(63) Continuation of application No. PCT/EP2009/051001, filed on Jan. 29, 2009.

(60) Provisional application No. 61/063,387, filed on Jan. 31, 2008.

(30) Foreign Application Priority Data

Jan. 31, 2008 (DE) .......................... 10 2008 007 023

(51) Int. Cl.
*H04B 3/54* (2006.01)
*H02J 1/00* (2006.01)

(52) U.S. Cl. ..................................... 307/3; 307/1; 307/4

(58) Field of Classification Search .................. 307/1, 3, 307/4
See application file for complete search history.

(56) References Cited

U.S. PATENT DOCUMENTS

| 6,218,930 | B1 | 4/2001 | Katzenberg et al. |
| 7,114,171 | B2* | 9/2006 | Brady et al. ..................... 725/77 |
| 7,365,449 | B2* | 4/2008 | Marin-Martinod et al. ... 307/9.1 |
| 7,689,327 | B2* | 3/2010 | Loda ................................ 701/3 |
| 7,893,557 | B2* | 2/2011 | Davis et al. .................... 307/9.1 |
| 2008/0136385 | A1* | 6/2008 | Hsieh et al. .................... 323/273 |
| 2010/0218003 | A1* | 8/2010 | Blaha et al. .................... 713/300 |

FOREIGN PATENT DOCUMENTS

| DE | 10 2005 024 933 A1 | 12/2006 |
| WO | WO 2009/095439 A2 | 1/2009 |

OTHER PUBLICATIONS

International Search Report for PCT/EP2009/051001 dated Aug. 24, 2009.
Lehr, "Power over LAN," Funkschau, No. 21, pp. 57-58 (2002).
B&B Electronics, "*Power of Ethernet (PoE)*," B&B Electronics Manufacturing Company, 2005, pp. 1-3 (Sep. 2005).

* cited by examiner

*Primary Examiner* — Hal Kaplan
(74) *Attorney, Agent, or Firm* — Jenkins, Wilson, Taylor & Hunt, P.A.

(57) ABSTRACT

System and method for the voltage supply of aircraft cabin modules (1). An electric supply voltage and an additive data signal are transmitted via a cable (3). The aircraft cabin modules (1) have a connection plug (2) for plugging onto the cable (3) and an isolating circuit (5), which isolates the transmitted supply voltage from the data signal.

17 Claims, 4 Drawing Sheets

METHOD AND SYSTEM FOR THE VOLTAGE SUPPLY OF AIRCRAFT CABIN MODULES

CROSS REFERENCE TO RELATED APPLICATIONS

This application is a continuation of PCT International Application No. PCT/EP2009/051001 filed Jan. 29, 2009, which claims the benefit of German Patent Application No. 10 2008 007023.8, filed Jan. 31, 2008 and U.S. provisional application No. 61/063,387 filed Jan. 31, 2008, the entire disclosures of which are herein incorporated by reference.

TECHNICAL FIELD

The invention relates to a method and system for the voltage supply of aircraft cabin modules, in particular of safety-relevant modules in an aircraft cabin by a combined transmission of data and a supply voltage or a supply current.

BACKGROUND

FIG. 1 shows a conventional system for the voltage supply of aircraft cabin modules.

A cabin server (CMS: Cabin Management Server) is serially connected via two lines to a plurality of decoding/coding units (DEU), within an aircraft cabin of an aircraft. A plurality of aircraft cabin modules is connected to each decoding/coding unit DEU. The aircraft cabin modules may, for example, be a passenger supply unit (PSU: Passenger Supply Unit) or a cabin illumination unit (IBU: Illumination Ballast Unit). As can be seen from FIG. 1, four passenger supply units (PSUs) and four cabin illumination units (IBUs) are connected to each decoding/coding unit. The passenger cabin modules are connected via cable and plug connections.

Each cable contains six separate lines, namely two data lines for transmitting data, one voltage supply line for transmitting an alternating voltage, an earth line for the alternating voltage, a direct voltage supply line and a direct voltage supply earth line. While the data lines are connected to the decoding/coding unit of the CIDS data bus (CIDS: Cabin Intercommunication Data System), the supply voltage lines are connected to a current supply network of the aircraft.

As can be seen from FIG. 1, the cabling of the data lines and the voltage supply lines are separate in the conventional system, with different connection plugs also being used for the data lines and the voltage supply lines. The conventional system shown in FIG. 1 has the drawback that because of the large number of laid data and voltage supply lines, the cabling is very complex, in particular in large passenger aircraft. Not only the high number of various lines, but also the different plug connectors for the data and voltage supply lines make assembly more difficult.

Because of the high number of laid lines, the weight is increased substantially, in particular in large passenger aircraft. This, in turn, leads to an increased fuel consumption during running operation of the aircraft.

It is therefore an object of the present invention to provide aircraft cabin modules which can be connected by cable with a minimum outlay.

SUMMARY

The invention provides an aircraft cabin module with a connection plug for connecting a cable, which has at least one electric data line, the aircraft cabin module containing an isolating circuit, which isolates the data from the impressed offset direct voltage, the impressed offset direct voltage and the data signal being received by the aircraft cabin module via the electric data line.

Preferred embodiments of the device according to the invention and the method according to the invention will be described below with reference to the accompanying figures to describe the features important to the invention.

DETAILED DESCRIPTION

Figure 2:
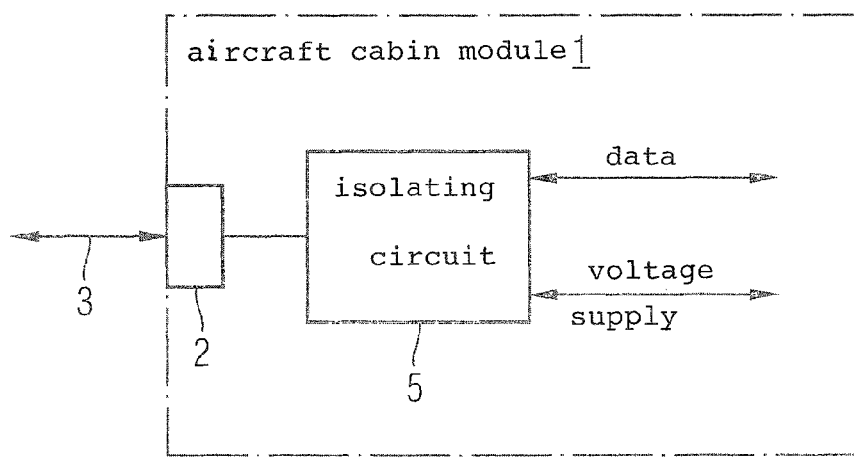
FIG. 2 shows a block diagram of a possible embodiment of the aircraft cabin module according to the invention.

As can be seen from FIG. 2, in the embodiment shown, an aircraft cabin module 1 has a connection plug 2, which is provided to connect a cable 3. The cable 3 contains at least one electric data line. A supply voltage (offset direct voltage) and a data signal are transmitted via this data line. The connection plug 2 is connected via an internal line to an isolating circuit 5 integrated in the aircraft cabin module 1. The isolating circuit 5 isolates the data signal received from the supply voltage impressed thereon. The isolated supply voltage is used for the voltage or current supply of further components within the aircraft cabin module 1. The supply voltage and the data signal are transmitted together via the data line contained in the cable 3. In this case, the data signal is additively superposed on the supply voltage, for example an offset direct voltage, in one possible embodiment. In one possible embodiment, the cable 3 contains an electric data feed line and an electric data return line. The two data lines may be sheathed with a cable sheath for electromagnetic shielding in one possible embodiment.

The aircraft cabin module shown in FIG. 2 may, for example, be a passenger supply unit PSU (Passenger Supply Unit), a cabin illumination unit IBU (Illumination Ballast Unit) or complex units such as FAPs (Flight Attendant Panel), CVMS (Cabin Video Monitoring System), PID (Passenger Information Display), info signs, smoke detectors etc. The aircraft cabin module 1, as shown in FIG. 2, may have a further connection plug and can be serially linked to further aircraft cabin modules 1 to form an aircraft cabin module chain (Daisy Chain). In a possible embodiment of the aircraft cabin module 1 according to FIG. 2, the data isolated by the isolating circuit 5 from the supply voltage are supplied to a data processing unit within the aircraft cabin module 1. The separated supply voltage is a direct supply voltage.

In one possible embodiment, an offset direct voltage DC is transmitted via a data line of the cable 3, a data signal being additively superposed on the offset direct voltage DC.

In one possible embodiment, the aircraft cabin module 1 shown in FIG. 2 can be configured via an interface. In this configuration, the amplitude of the supply voltage additionally transmitted via the data line can be configured. For example, the aircraft cabin module 1 is configured such that the supply voltage is a DC direct voltage with an amplitude of 28 volts.

In a further configuration example, the aircraft cabin module 1 is configured such that the supply voltage is a direct voltage DC.

In a possible embodiment, the configuration of the aircraft cabin module 1 with respect to the supply voltage may take place manually, for example by the installation of a correspondingly dimensioned isolating circuit 5 into the aircraft cabin module 1.

In an alternative embodiment, the isolating circuit 5 is configured separately with respect to the supply voltage by transmitting corresponding configuration data via the cable 3.

Figure 3:
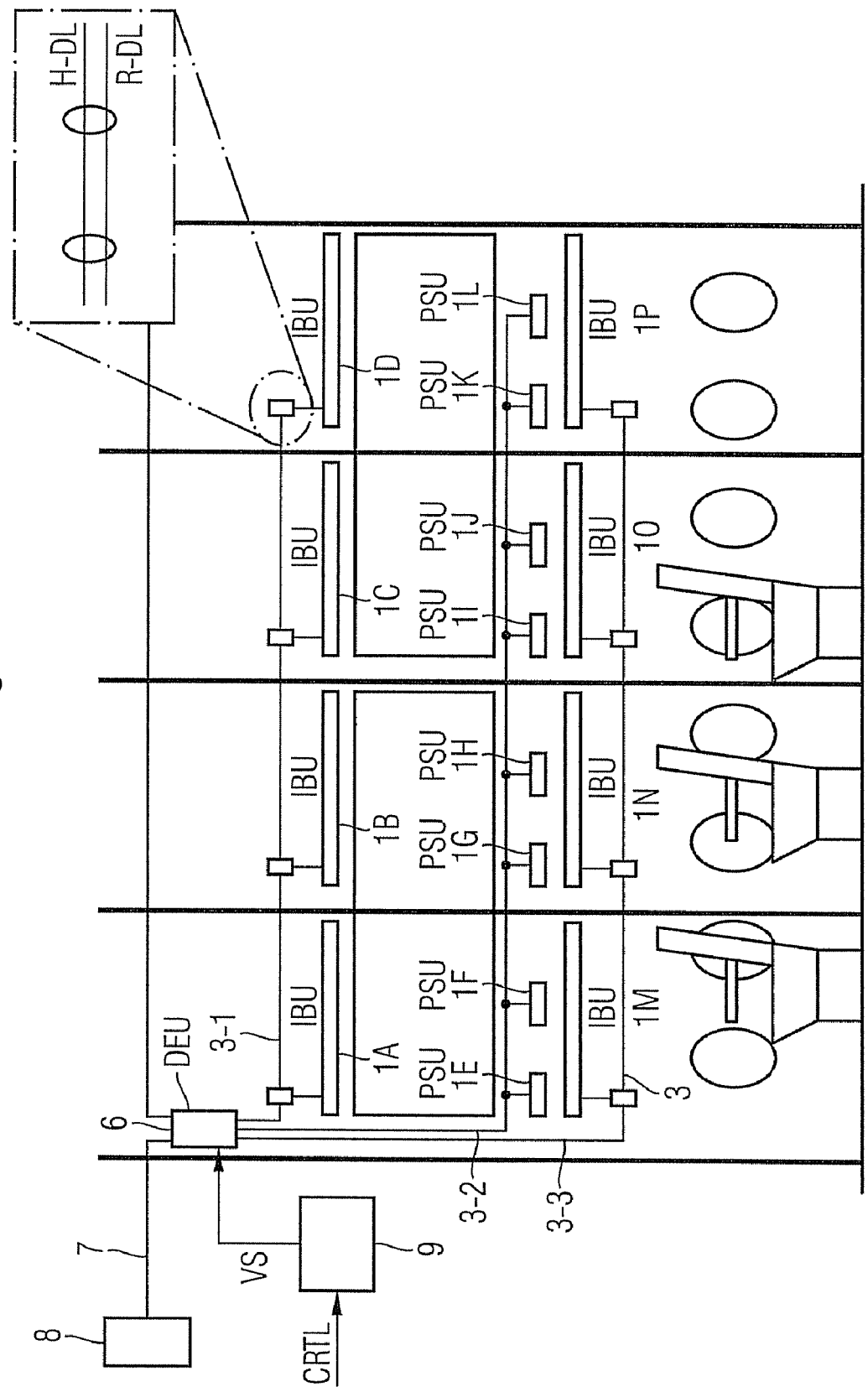
FIG. 3 shows an embodiment of a system for connecting aircraft cabin modules by cable according to the invention.

FIG. 3 shows an embodiment of a system for the cabling and the voltage supply of aircraft cabin modules 1 according to the invention.

Figure 1:
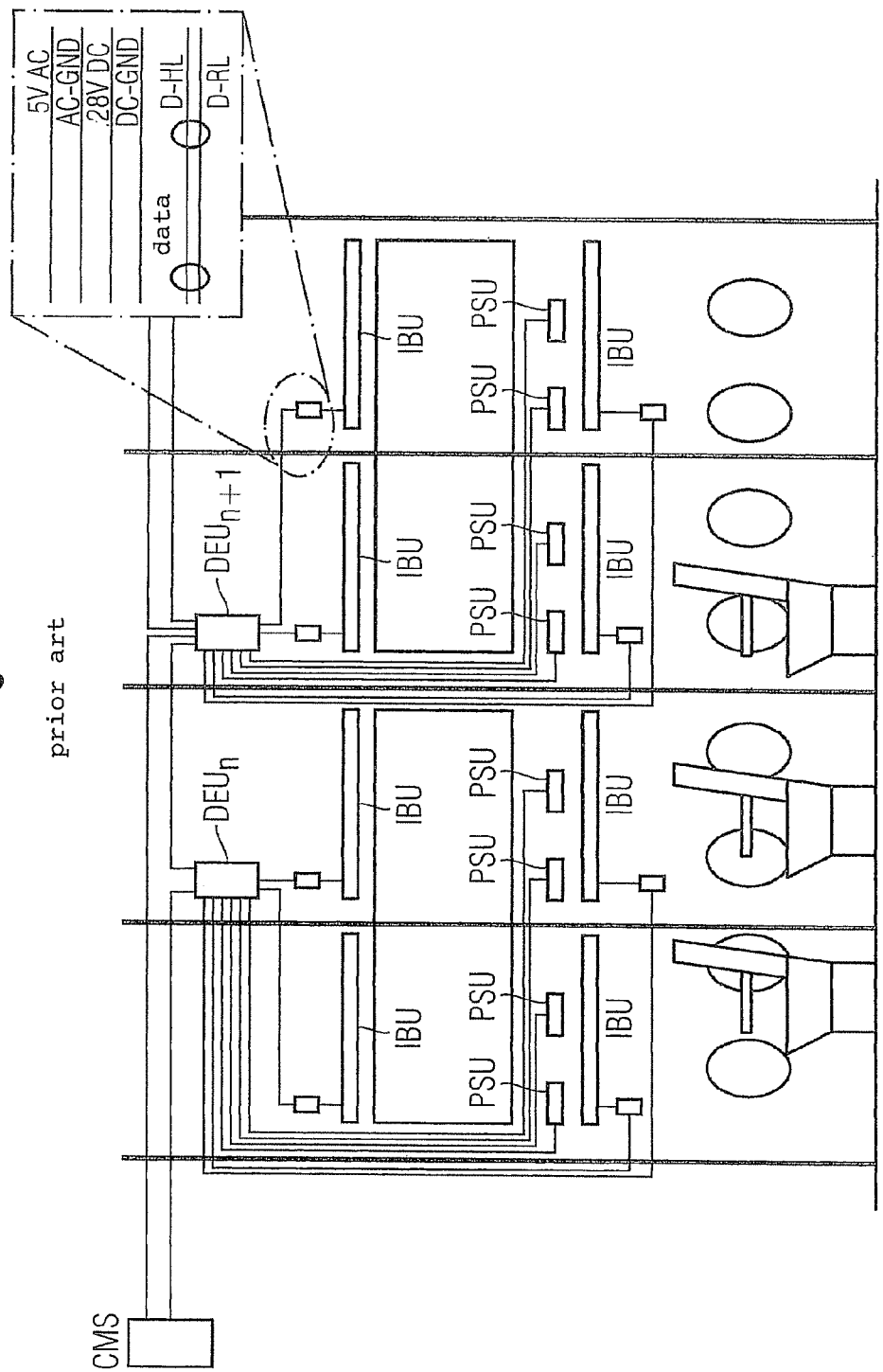
FIG. 1 shows a conventional system for connecting aircraft cabin modules by cable.

A decoding/coding unit 6 is connected via a bus 7 to an aircraft cabin server 8. A supply voltage VS, which comes from a unit 9, is fed in at the decoding/coding unit 6. 16 aircraft cabin modules 1 are connected to the decoding/coding unit 6 via 3 different cables 3-1, 3-2, 3-3 in the embodiment shown in FIG. 3. Four upper cable illumination units 1A, 1B, 1C, 1D are connected via a first cable 3-1. Eight passenger supply units (PSU) 1E to 1L are connected to the decoding/coding unit 6 via a second cable 3-2. Four lower cabin illumination modules (IBU) 1M, 1N, 1O, 1P are also connected to the decoding/coding unit 6 via a third cable 3-3. In the embodiment shown in FIG. 3, each of the three cables 3-1, 3-2, 3-3 has an electric data feed line HDL and an electric data return line RDL. The aircraft cabin modules 1 of each group are serially linked via the respective cable 3 to further aircraft cabin modules 1 to form an aircraft cabin module chain (daisy chain). The supply voltage VS fed in at the decoding/coding unit 6 together with the data signal is transmitted on a line to the serially linked aircraft cabin modules 1 via the electric data lines of the cable 3 (power over data). If the system shown in FIG. 3 is compared with the conventional system shown in FIG. 1 it can be seen that the number of laid lines for the sixteen aircraft cabin modules 1 connected by cable is substantially reduced in the system according to the invention according to FIG. 3. On the one hand, this simplifies assembly of the aircraft cabin modules 1 substantially and, on the other hand, reduces the weight of the aircraft, and so fuel is saved during running operation of the aircraft.

In one possible embodiment, the fed-in supply voltage VS can be switched over between various voltage levels. In one possible embodiment, the fed-in supply voltage VS is an offset direct voltage, which can be switched over between three different voltage levels, namely a normal direct voltage level, an emergency direct voltage level and a high direct voltage level. The switch-over may take place as a function of a control signal CRTL applied to the unit 9.

Figure 4:
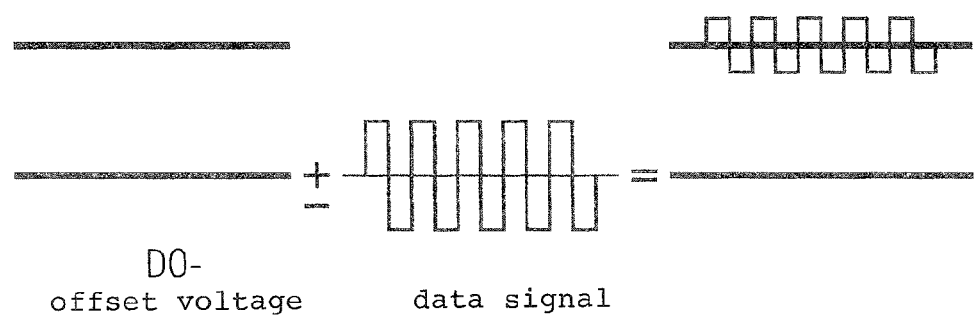
FIG. 4 shows a signal diagram to explain an embodiment of a method according to the invention for the voltage supply of an aircraft cabin module.

In one possible embodiment, the cables 3 shown in FIG. 3 are laid in a supply duct of the aircraft. In the system according to the invention, as shown in FIG. 3, the number of laid lines is reduced by the use of sub-networks, which in each case consist of a chain of aircraft cabin modules 1. FIG. 4 shows a signal diagram to explain a possible embodiment of the method according to the invention for the voltage supply of aircraft cabin modules 1.

In the embodiment shown in FIG. 4, a digital data signal is impressed on a DC offset supply voltage by additive superposition. The signal, which is transmitted via the data lines of the cable, is shown as a summation signal. In the example shown, the data signal is a sequence of alternating data values +1, −1. However, any desired data signal can be transmitted via the data line. In addition, the offset direct voltage can be switched over between various amplitude values in one possible embodiment.

Figure 5:
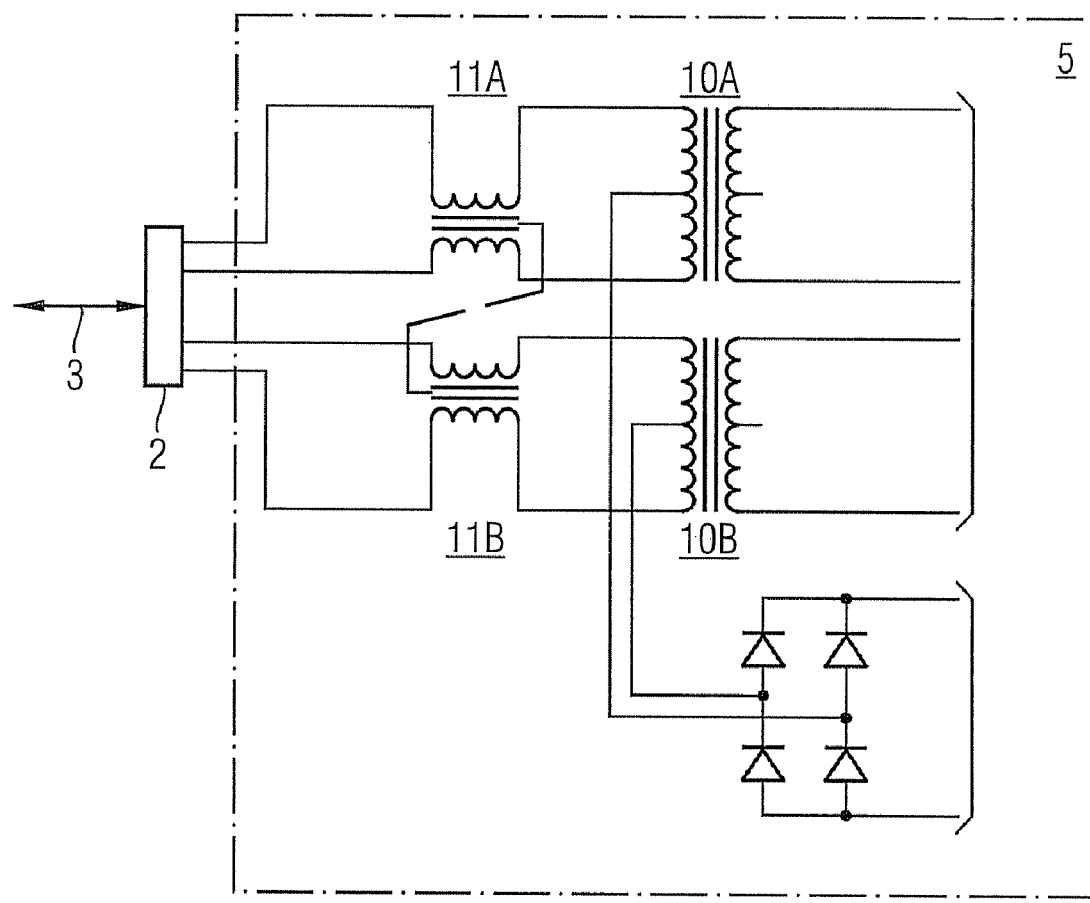
FIG. 5 shows an embodiment of an isolating circuit contained in an aircraft cabin module according to the invention.

FIG. 5 shows an embodiment of an isolating circuit 5 contained in an aircraft cabin module 1 according to the invention. The isolating circuit 5 contains, in the embodiment shown in FIG. 5, two isolating transformers 10A, 10B, which in each case have a primary coil and a secondary coil. The primary coils of the two isolating transformers 10A, 10B are in each case connected via a throttle 11A, 11B to the connection plug 2. The throttles 11A, 11B are used to suppress the signal. The secondary coils of the two isolating transformers 10A, 10B may be connected to a data processing unit to process the transmitted data signal, for example by an Ethernet-PHY. The direct supply voltage transmitted via the cable 3 for the supply voltage of the aircraft cabin module 1 is tapped at a central tap of the primary coils of the isolating transformers 10A, 10B. The two central taps of the primary coils are, as shown in FIG. 5, connected to a bridge rectifier circuit constructed from four diodes. The bridge rectifier circuit, for example, supplies a direct supply voltage for the voltage supply of the aircraft cabin module at a level of 24 volts DC or 48 volts DC. The connection plug 2 is suitable, for example, for connecting a 100 MB Ethernet cable to two feed and two return lines.

In one possible embodiment, the aircraft cabin module 1 can be plugged in or unplugged during running operation by means of the connection plug 2, or in other words is hot-plug capable. This is possible because of the coils, which damp voltage peaks when the aircraft cabin module 1 is plugged in or unplugged.

It is possible with the cabling system according to the invention for the voltage supply of aircraft cabin modules 1 to transmit a high output at the level of several hundred watts to aircraft cabin modules 1 with a high current consumption, for example to LED strips for cabin illumination or to reading lamps. The cables 3, which have an electric data feed line and an electric data return line, often already have a sheath for electromagnetic shielding. The system according to the invention is therefore particularly suitable for aircraft of which the fuselage is constructed from carbon fibres, as protection against being struck by lightning is particularly important here. By using cables 3 which already have electromagnetic shielding, it is possible to reliably transmit data, even in the event of a possible lightning strike, within the aircraft between the aircraft cabin modules 1. The voltage supply is transmitted regardless of the type of data bus used. The aircraft cabin modules 1 are serially connected by cable within a so-called daisy chain and not in a star shape. Moreover, the aircraft cabin modules 1 can be plugged in or unplugged at any time during running operation, without impairing the data transmission outside the respective aircraft cabin module chain.

It is moreover possible to increase the safety and reliability of the voltage supply for the aircraft cabin modules 1 in that an additional back-up supply voltage, for example an emergency voltage, is fed in via the data lines. The provision of a common data and energy supply also substantially facilitates the simple installation of aircraft cabin modules 1. In the system according to the invention, the supply voltage is supplied by means of a loop to the linked aircraft cabin modules 1. As a result, the number of cables 3 to be laid is substantially reduced, and so the total weight of the aircraft and therefore the running operating costs are decreased. The reduction in the number of necessary lines also makes it possible to use cables 3 with a smaller diameter, so assembly may be carried out in a space-saving manner.

The invention claimed is:

1. An aircraft cabin module, comprising:
   (a) a connection plug for connecting a cable having at least one electric data line and a sheath for electromagnetic shielding;
   (b) an isolating circuit for isolating a data signal from a direct supply voltage transmitted via the electric data line, the isolating circuit comprising two isolating transformers connected via a throttle for signal suppression to the connection plug, wherein the direct supply voltage and the data signal are additively superimposed on the direct supply voltage and are transmitted via the electric data line of the cable, and wherein the direct supply voltage is switchable over between various voltage levels; and
   (c) a decoding/coding unit for connecting to an aircraft server.

2. The aircraft cabin module according to claim 1, further comprising an interface for configuring the amplitude of the direct supply voltage transmitted via the electric data line.

3. The aircraft cabin module according to claim 1, wherein the cable comprises at least one electric data feed line and at least one electric return data line.

4. The aircraft cabin module according to claim 1, wherein the aircraft cabin module is at least one of a passenger supply unit or a cabin illumination unit.

5. The aircraft cabin module according to claim 1, wherein the aircraft cabin module is serially linkable via the cable to further aircraft cabin modules to form an aircraft cabin module chain.

6. The aircraft cabin module according to claim 5, wherein an aircraft cabin module chain is connected to the decoding/coding unit.

7. The aircraft cabin module according to claim 1, wherein the direct supply voltage is fed in at the decoding/coding unit.

8. The aircraft cabin module according to claim 1, wherein the voltage levels of the direct supply voltage have one of a normal direct voltage level, an emergency direct voltage level, or a high direct voltage level.

9. The aircraft cabin module according to claim 8, wherein the normal direct voltage level is one of 28V or 42V.

10. The aircraft cabin module according to claim 1, wherein the cable is laid in a supply duct of an aircraft.

11. The aircraft cabin module according to claim 1, wherein the isolating transformers each comprise a primary coil connected via a throttle to the connection plug and a secondary coil.

12. The aircraft cabin module according to claim 11, wherein the transmitted direct supply voltage for the voltage supply of the aircraft cabin module is tappable at a central tap of the primary coils of the isolating transformers.

13. The aircraft cabin module according to claim 12, wherein the two central taps of the primary coils of the isolating transformers are connected to a bridge rectifier circuit.

14. The aircraft cabin module according to claim 1, wherein the aircraft cabin module is in one of a plugged mode or an unplugged mode during running operation by the connection plug.

15. A network with a plurality of the aircraft cabin modules according to claim 1, comprising serially connected aircraft cabin modules connected to one another via the cable.

16. A method for the voltage supply of at least one aircraft cabin module comprising the steps of:
   additively superimposing a data signal on a direct supply voltage received by the aircraft cabin module via an electric data line of a cable having electromagnetic shielding;
   separating the direct supply voltage from the superimposed data signal in a decoding/coding unit; and
   switching the direct supply voltage via two isolating transformers connected via a throttle for signal suppression to the connection plug over between various voltage levels.

17. The method according to claim 16, wherein the amplitude of the direct supply voltage transmitted via the electric data line is configured via an interface of the aircraft cabin module.

* * * * *